(12) United States Patent
Frank (10) Patent No.: US 8,530,847 B2
(45) Date of Patent: Sep. 10, 2013

(54) SCINTILLATION ARTICLE

(75) Inventor: John M. Frank, Hartville, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 260 days.

(21) Appl. No.: 12/947,013

(22) Filed: Nov. 16, 2010

(65) Prior Publication Data

US 2011/0121187 A1 May 26, 2011

Related U.S. Application Data (60) Provisional application No. 61/261,626, filed on Nov. 16, 2009.

(51) Int. Cl.
*G01T 1/20* (2006.01)
(52) U.S. Cl.
USPC ............................... 250/368; 250/361 R
(58) Field of Classification Search
USPC .............................. 250/368, 361 R
See application file for complete search history.

(56) References Cited

U.S. PATENT DOCUMENTS

| | | | |
|---|---|---|---|
| 3,426,195 A | 2/1969 | Menefee et al. | |
| 3,917,950 A | 11/1975 | Carlson | |
| 4,004,151 A | 1/1977 | Novak | |
| 4,158,773 A | 6/1979 | Novak | |
| 4,360,733 A | 11/1982 | Novak et al. | |
| 4,383,175 A | 5/1983 | Toepke | |
| 4,764,677 A | 8/1988 | Spurney | |
| 4,833,320 A | 5/1989 | Hurlbut | |
| 4,900,937 A | 2/1990 | Dayton et al. | |
| 5,548,116 A | 8/1996 | Pandelisev | |
| 5,742,057 A | 4/1998 | Frederick et al. | |
| 5,796,109 A | 8/1998 | Frederick et al. | |
| 5,869,836 A | 2/1999 | Linden et al. | |
| 6,355,932 B1 | 3/2002 | Frederick | |
| 6,359,282 B1 | 3/2002 | Sekela | |
| 7,034,305 B2 | 4/2006 | Frederick et al. | |
| 7,247,853 B2 | 7/2007 | Frederick et al. | |
| 7,550,729 B2 | 6/2009 | Hochstetler et al. | |
| 2007/0007460 A1 | 1/2007 | Hochstetler et al. | |
| 2007/0145260 A1 | 6/2007 | Frederick et al. | |

FOREIGN PATENT DOCUMENTS

| | | |
|---|---|---|
| JP | 2001-503507 A | 3/2001 |
| JP | 3144944 U9 | 8/2008 |
| JP | 2008-256631 A | 10/2008 |

OTHER PUBLICATIONS

International Search Report for PCT/US2010/056784 dated Jul. 19, 2011, 3 pgs.

*Primary Examiner* — David Porta
*Assistant Examiner* — Faye Boosalis
(74) *Attorney, Agent, or Firm* — Abel Law Group, LLP; Robert T. Young (57) ABSTRACT

According to one embodiment, a scintillation article includes a detector housing having a window cavity and a window disposed within the window cavity. The window cavity defining a window opening at an external surface of the housing that has a greater width than a width of the window, and wherein a surface of the window is directly bonded to an interior surface of the detector housing at a bond joint comprising a diffusion bond region.

20 Claims, 6 Drawing Sheets

SCINTILLATION ARTICLE

CROSS-REFERENCE TO RELATED APPLICATION(S)

The present application claims priority from U.S. Provisional Patent Application No. 61/261,626, filed Nov. 16, 2009, entitled "Scintillation Article," naming inventor John M. Frank, which application is incorporated by reference herein in its entirety.

BACKGROUND

1. Field of the Disclosure

The following is directed to a scintillation article, and particularly a scintillation article employing a particular detector housing and window construction.

2. Description of the Related Art

Radiation detector devices are used in a variety of industrial applications. Typically, radiation detectors include scintillators made of a material sensitive to a particular type of radiation. Scintillation detectors are useful for measuring certain types of particle emissions, such as gamma rays, neutrons, alpha particles, and beta particles emitted from different source materials. For example, certain materials such as sodium iodide are useful for detecting gamma rays. In response to particular types of incident radiation striking the scintillator, particular wavelengths of radiation are reemitted or fluoresced by the scintillator (i.e., radiation-induced scintillation light) and can be transmitted to a light-sensing device, such as a photomultiplier tube. The photomultiplier tube converts the light photons emitted from the crystal into electrical pulses. The electrical pulses are shaped and digitized by associated electronics and may be registered as counts that are transmitted to analyzing equipment.

Detector devices utilizing scintillation devices are used in a variety of applications, ranging from for example, medical imaging to well logging in the oil and gas industry, and even monitoring of background radiation levels. For applications where the scintillator is employed in more potentially hazardous environments, such as downhole measure-while-drilling (MWD) operations, the scintillator can be contained within a ruggedized housing. The scintillator housing can include a window at one end that allows the fluoresced light to pass from the housing to a light-sensing device such as a photomultiplier tube (PMT). The photomultiplier tube converts the fluoresced light emitted from the crystal into electrical pulses, which are shaped and digitized by associated electronics and may be registered as counts that are transmitted to analyzing equipment. Nonetheless, the industry continues to demand scintillation articles having improved durability and accuracy.

SUMMARY

According to one aspect, a scintillation article includes a detector housing comprising a window cavity, a window disposed within the window cavity, the window cavity defining a window opening at an external surface of the housing that has a greater width than a width of the window. The window has a surface that is directly bonded to an interior surface of the detector housing at a bond joint comprising a diffusion bond region.

In another aspect, a scintillation article includes a detector housing having a window cavity, and a window comprising a crystalline material disposed within the window cavity. The window has a front surface, a rear surface parallel to the front surface, and a side surface extending between the front surface and rear surface, wherein a portion of the rear surface is directly contacting an inner surface of the housing.

According to still another aspect, a scintillation article includes a detector housing, and a window disposed within the housing, the window having a front surface, a rear surface parallel to the front surface, and a side surface extending between the front surface and rear surface at a substantially perpendicular angle to the front surface, wherein the detector has a photo collection efficiency of at least about 74%.

In yet another aspect, a scintillation article includes a detector housing comprising a window cavity within the detector housing, and a window disposed within the window cavity, the window having a front surface and a rear surface parallel to the front surface, wherein the front surface has a width that is at least the same width of the rear surface and wherein a portion of the rear surface is directly contacting an inner surface of the detector housing.

According to yet another aspect, a scintillation article includes a detector housing, and a window disposed within the detector housing, wherein the window includes a front surface, a rear surface parallel to the front surface, and a side surface extending between the front surface and rear surface at a substantially perpendicular angle to the front surface. The side surface of the window is directly bonded to an inner surface of the detector housing at a bond joint to form a bond assembly, wherein the bond assembly has a failure stress of at least about 130 MPa.

In still another aspect, a scintillation article includes a detector housing comprising a window cavity within the detector housing, and a window disposed within the window cavity and directly bonded to the detector housing at a bond joint, wherein the window has a window area that comprises at least about 88% of the total external lateral area of the front of the detector housing.

DETAILED DESCRIPTION

The following is directed to a scintillation article, and particularly a scintillation article including a detector housing configured to contain a scintillation material that can be coupled to a sensor, such as a photodetector, for use in various applications for detecting radiation. Some suitable applications can include imaging, such as medical imaging technologies, as well as uses in the oil and gas industries, such as detectors suitable for use in downhole environments for geographical mapping of rock strata.

The term "radiation" is defined herein to include electromagnetic radiation and high-energy particles (e.g., gamma radiation, alpha particles and beta particles), which can be detected by scintillator materials. The term "light" is defined herein to include electromagnetic radiation without mass, of any wavelength, and is not limited to wavelengths within the visible portion of the electromagnetic spectrum. The term "scintillator" is defined herein as a material that emits light in response to excitatory radiation incident thereon.

Figure 1:
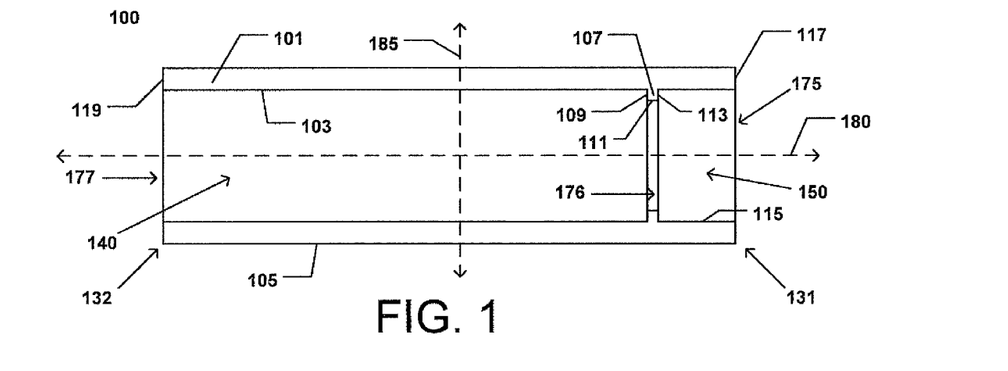
FIG. 1 includes a cross-sectional illustration of a scintillation article in accordance with an embodiment.

FIG. 1 includes a cross-sectional illustration of a scintillation article in accordance with an embodiment. The scintillation article 100 can include a detector housing 101. The detector housing 101 can have a particular shape. For example, the detector housing 101 can have a cylindrical shape such that the detector housing 101 has a generally cylindrical cross-sectional shape as viewed in a plane extending perpendicular to the longitudinal axis 180 of the detector housing 101. Still, other designs may employ a detector housing 101 having various other contours, such that for example, the cross-sectional shape of the detector housing 101 as viewed in a plane extending perpendicular to the longitudinal axis 180 can be various polygonal shapes.

Additionally, the detector housing 101 can be made of an inorganic material. For example, the detector housing 101 can be made of an inorganic material selected from the group of materials consisting of ceramics, metals, metal alloys, and a combination thereof. Particularly suitable metals can include elements such as Al, Ti, V, Cr, Mo, Mn, Ni, Cu, Zn, Zr, Mo, Ta, Fe, Pt, Sn, and a combination thereof. Certain detector housings can be made of a material including a titanium-based alloy, an iron-based alloy (e.g., steel), a nickel-based alloy, or an aluminum-based alloy.

As illustrated, the detector housing 101 can be formed such that is has an outer surface 105 defining the external contour of the detector housing 101. Moreover, the detector housing 101 can include an inner surface 103 defining the interior contour of the detector housing 101. Notably, the inner surface 103 of the detector housing 101 can define particular cavities within the interior of the detector housing 101 configured to contain particular components of the scintillation article.

The detector housing 101 can include a window cavity 150 that is positioned at a distal end 131 of the detector housing 101 at an external, front surface 117 of the detector housing 101 and configured to contain a window therein. The window cavity 150 can extend axially inward into the interior of the detector housing 101 along the longitudinal axis 180. In accordance with an embodiment, the window cavity 150 can be defined as the region between a protrusion 107 extending radially inward from the inner surface 103 of the detector housing 101 and the external, front surface 117 of the detector housing 101. The external, front surface 117 of the detector housing can extend between the outer surface 105 and inner surface 103 of the detector housing.

Notably, the window cavity 150 can be positioned within the detector housing 101 and have a particular design such that it facilitates front-loading of a window therein. That is, the window cavity 150 can be formed such that during assembly of the scintillation article, a window can be loaded and secured to the detector housing 101 by loading the window at the distal end 131 of the detector housing 101 through the opening 175 at the distal end 131 of the detector housing 101. The window cavity 150 may also be defined as a region between the opening 175 at the distal end 131 and an opening 176 within the interior of the detector housing 101. The opening 175 can be defined by the edge between the external, front surface 117 of the detector housing 101 and the inner surface 103 of the detector housing 101. The opening 176 can be defined by a side surface 111 of a protrusion 107 extending radially inward from the inner surface 103 of the detector housing 101. The opening 175 can have a diameter (or width) that is significantly greater than the diameter (or width) of the opening 176. Accordingly, by virtue of the difference in diameters (or widths) between the opening 175 and opening 176 a window cavity 150 is created that facilitates front-loading of a window at the distal end 131 of the detector housing 131.

In particular instances, the detector housing 101 can be formed such that the protrusion 107 extends radially inward from the inner surface 103 of the detector housing 101. The protrusion 107 can be formed to have various certain shapes. While the protrusion 107 of FIG. 1 is illustrated as having generally linear surfaces and a generally rectangular cross-sectional shape, it will be appreciated that other shapes (e.g., polygonal, circular, etc) can be utilized. It will further be appreciated that the protrusion 107 can utilize one or more curved surfaces.

According to one embodiment, the protrusion 107 can be defined by a rear surface 109 extending substantially parallel to the radial axis 185 and substantially perpendicular to the longitudinal axis 180 of the detector housing 101. Additionally, the protrusion 107 can be further defined by a front surface 113 extending substantially parallel to the rear surface 109, which is in a direction substantially parallel to the radial axis 185 and substantially perpendicular to the longitudinal axis 180 of the detector housing 101. The protrusion 107 can be further defined by a side surface 111 extending between and separating the rear surface 109 and front surface 113. The side surface 111 can extend in a direction that is substantially perpendicular to the radial axis 185 and substantially parallel to the longitudinal axis 180. The protrusion 107 can be formed such that the front surface 113 is closer to the distal end 131 of the detector housing 101 than the rear surface 109.

According to certain designs, the protrusion 107 can be located proximal to the distal end 131 of the detector housing 101. That is, the protrusion 107 is located at a position along the longitudinal axis 180 that is closer to the distal end 131 than the proximal end 132 of the detector housing 101. In particular, the front surface 113 of the protrusion 107 can be positioned within the detector housing 101 at a distance from the front, external surface 117 that is equal to and not greater than the thickness of a window configured to be disposed within the window cavity 150.

In accordance with certain embodiments, the protrusion 107 can be formed such that it extends through a portion of the circumference (or peripheral distance if the cross-sectional shape is not circular) of the inner surface. That is, the protrusion 107 may extend circumferentially along the inner surface 103. Particular designs may utilize a protrusion 107 that can be a rim extending through a full circumference (or peripheral distance) of the inner surface 103 of the detector housing 101. It will be appreciated however, that in other embodiments, the protrusion 107 may be a segmented member, such that a plurality of discrete protrusion segments extend through a circumference of the inner surface 103, wherein in each of the discrete segments extend through a fraction of the total circumference of the inner surface 103 of the detector housing 101.

In accordance with certain embodiments, the detector housing 101 can be formed such that the protrusion 107 separates and therein defines two distinct cavities within the interior of the detector housing 101. That is, for example the protrusion 107 can define the window cavity 150 within the region between the front surface 113 of the protrusion 107 and the distal end 131 of the detector housing 101. The region between the rear surface 109 of the protrusion 107 and the proximal end 132 of the detector housing 101 can define a scintillator cavity 140. Accordingly, the protrusion 107 can separate the window cavity 150 from the scintillator cavity 140.

In particular, the scintillator cavity 140 can be configured to hold a scintillation material. According to embodiments herein, the detector housing 101 can be formed with a scintillator cavity 140 wherein the scintillator is configured to be loaded through an opening 177 at the proximal end 132 of the detector housing 101. Notably, the proximal end 132 of the detector housing 101 can include an opening 177 defined as the edge between an external, rear surface 119 of the detector housing 101 and the inner surface 103 of the detector housing 101. According to certain embodiments, the opening 177 can have a diameter (or width) that is greater than the diameter (or width) of the opening 176 defined by the side surface 111 of the protrusion within the interior of the detector housing 101. Still, the opening 177 may have a diameter 176 that is approximately the same size of the opening 175 at the distal end 131 of the detector housing 101. In other embodiments, the opening 177 can have a diameter that is greater than the diameter of the opening 175.

The opening 177 at the proximal end 132 of the detector housing 101 is configured to have a size sufficient to facilitate loading of a scintillator within the scintillator cavity 140. As such, according to certain designs herein, the window is configured to be loaded into the detector housing 101 at a distal end 131, which is an opposite end, from which other components (e.g., the scintillator) are configured to be loaded into the detector housing 101.

Figure 2:
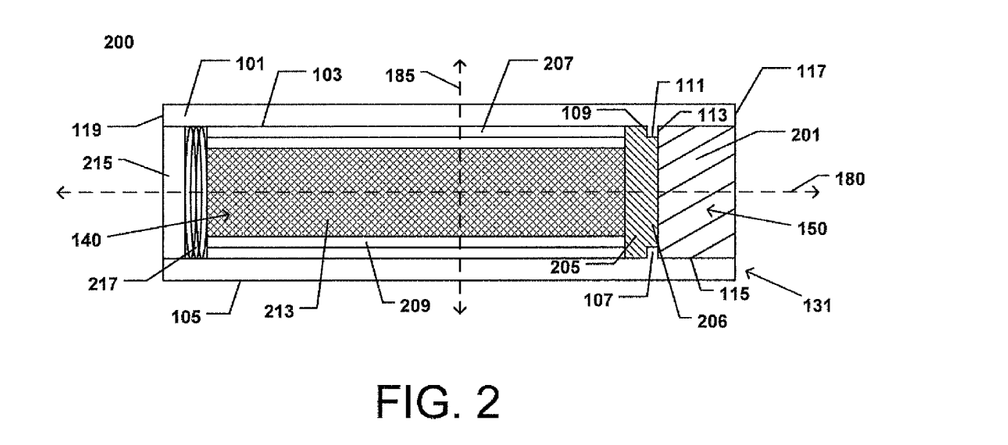
FIG. 2 includes a cross-sectional illustration of a scintillation article in accordance with an embodiment.

FIG. 2 includes a cross-sectional illustration of a scintillation article in accordance with an embodiment. In particular, FIG. 2 includes an illustration of an assembled scintillation article including certain components configured to be contained within the scintillation article 200. As illustrated, the assembled scintillation article can include particular components contained within certain cavities of the detector housing 101. That is, for example the window cavity 150 can be configured to contain a window 201. The window 201 can be configured to be loaded through the opening 175 at the distal end 131 of the detector housing 101 until it is abutting a surface of the protrusion 107. As illustrated, the window 201 is configured to be contained within the window cavity 150 such that a portion of the window 201, particularly a rear surface of the window 201 can be abutting the front surface 113 of the protrusion 107. Moreover, a portion of the surface of the window 201, such as a portion of a side surface can be abutting the inner, side surface 115 of the window cavity 150. Further description of the placement of the window 201 within the window cavity 150 will be provided herein.

As further illustrated, the scintillation article 200 can be assembled such that certain components are contained within the scintillator cavity 140. According to one embodiment, a scintillator 213 can be disposed within the scintillator cavity 140 of the detector housing 101. The scintillator 213 can have various shapes, such as a rectangular shape, or a cylindrical surface including flat end faces at opposite ends to facilitate disposal within the detector housing 101. It will be appreciated that the surface finish of the scintillator 213 can be sanded, polished, ground, etc., as desired.

In accordance with certain embodiments, the scintillator 213 can include an inorganic material, organic material, and a combination thereof. Moreover, the scintillator 213 can include a material having a crystalline phase, an amorphous phase, and a combination thereof. In particular instances, the scintillation articles of embodiments herein can be formed of a material having a crystalline phase, and more particularly may be formed of materials consisting essentially of a crystalline phase, such that certain scintillators can be essentially single crystal materials.

Additionally, certain scintillators of embodiments herein can be formed of materials selected from a group of materials consisting of oxides, halides, sulfides, and a combination thereof. Some scintillators can be rare-earth halide materials, including for example, $LaBr_3$, $CeBr_3$, $LuI_3$, $LaCl_3$, and a combination thereof. In certain instances, the scintillator can be a scintillator crystal, and the scintillator crystal may be a hygroscopic material.

Certain scintillation articles can be formed such that a reflector 209 can be disposed within the scintillator cavity 140. In particular, the reflector 209 can be adjacent to the scintillator 213, and more particularly may be abutting and surrounding the scintillator 213. The reflector 209 can include a suitable reflecting material such as a powder, like aluminum oxide (alumina) powder, or a reflective tape or foil such as, a white porous unsintered PTFE material. A porous reflective material facilitates the escape of air or gas from between the reflector film and crystal face and can avoid pockets of trapped air or gas which could prevent the end reflector 209 from being pushed by a cushion pad (not illustrated) that can be disposed between the scintillator 213 and cap 215. According to particular embodiment, the reflector 209 can be a film of material that can be wrapped at least once around the crystal and possibly two or more times as desired. Alternatively, the reflector 209 can be a preformed shape, such as a metal material that is shaped to slide over the outer surface of the scintillator 213.

In accordance with a particular embodiment, the reflector 209 can be a preformed sheet containing a fluorinated polymer. In one embodiment, the fluorinated polymer can include a fluorine substituted olefin polymer comprising at least one monomer selected from the group consisting of vinylidene fluoride, vinylfluoride, tetrafluoroethylene, hexafluoropropylene, trifluoroethylene, chlorotrifluoroethylele, ethylene-chlorotrifluoroethylene, and mixtures of such fluoropolymers. In one particular embodiment, the reflector 209 is made essentially of a fluorinated polymer. In another more particular embodiment, the reflector 209 is made essentially of polytetrafluoroethylene (PTFE).

As further illustrated, the scintillation article 200 may be formed such that a shock absorbing member 207 can be disposed within the scintillator cavity 140. The shock absorbing member can be disposed adjacent to the scintillator 213, and more particularly abutting the reflector 209 and disposed between the reflector 209 and the inner surface 103 of the detector housing 101. The shock absorbing member 207 can surround and exert a radial force on the reflector 209 and the scintillator 213. As shown, the shock absorbing member 207 can be cylindrical to accompany the selected shape of the scintillator 213.

The shock absorbing member 207 can be made of a resiliently compressible material and according to one embodiment, is a polymer, such as an elastomer. Additionally, the surface contour of the shock absorbing member 207 can vary along the length to provide a frictionally engaging surface thereby enhancing the stabilization of the scintillator 213 within the detector housing 101. For example, the shock absorbing member 207 can have a uniform inner surface and an outer surface. Alternatively, the outer surface of the shock absorbing member can have ribs extending radially, axially, circumferentially or a combination thereof, which in some designs, but not all, are configured to engage the inner surface 103 of the detector housing 101. Still, the shock absorbing member 207 can have protrusions, dimples, or other shaped irregularities along the inner and outer surfaces to frictionally engage abutting components within the scintillator cavity 140.

In further reference to the components of the scintillation article 200, an optional sleeve component (not illustrated) can be placed within the scintillator cavity 140 and extend along the length of the scintillator cavity 140 from the protrusion 107 to a biasing member 217 and substantially surround the shock absorbing member 207, reflector 209 and scintillator 213. The sleeve can substantially surround and provide a radially compressive force to the shock absorbing member 207, reflector 209, and scintillator crystal 213 in the assembled state within the scintillator cavity 140. According to one embodiment, insertion of the sleeve into the detector housing 101 can require compression of the sleeve thereby providing a radially compressive force on the scintillator 213.

Suitable materials for the sleeve can include resilient materials, which can include inorganic materials, organic materials, and a combination thereof. For example, the sleeve can be formed of a material such as a metal, metal alloy, a polymer, carbon or the like.

As further illustrated, the scintillation article 200 can include a biasing member 217 that can be disposed at the proximal end 132 of the detector housing 101 and configured to bias the scintillator 213 in an axial direction along the longitudinal axis 180 towards the window 201. According to one embodiment, the biasing member 217 can be a stack of wave springs disposed crest-to-crest. Other suitable biasing members can include but are not limited to, a single wave spring such as disclosed in Application No. 61/053,312 incorporated herein, coil springs, resilient pads, pneumatic devices or even devices incorporating a semi-compressible liquid or gel. As such, suitable materials for the biasing member 240 can include a metal, a metal alloy, polymers, or the like.

As further illustrated, the scintillation article 200 may be formed to include a cap 215 at the proximal end 132 of the detector housing 101 for sealing the scintillator 213 within the detector housing 101. Suitable means of sealing the cap 215 to the detector housing can include brazing, a vacuum type peripheral weld, totally inert gas welding procedures, bonding compositions, and a combination of such means.

As further illustrated, the scintillation article 200 can include an interface pad 205, which in one embodiment can be an optically transparent (i.e., at least about 80% transmission) interface pad 205, particularly may be substantially transparent to electromagnetic radiation within the ultraviolet portion and/or near ultraviolet portion of the electromagnetic spectrum (e.g., 10 nm to 450 nm) disposed between the scintillator 213 and the window 201. The interface pad 205 can provide optical coupling between the scintillator 213 and window 201 such that scintillated light generated by the scintillator 213 can transfer through the interface pad 205 and through the window 201 to a detector mounted to the distal end 131 of the scintillation article 200 configured to receive the scintillated radiation.

The interface pad 205 can include an inorganic material, organic material, and a combination thereof. For example, according to one embodiment, the interface pad 205 includes a transparent polymer material, such as a transparent silicone elastomer, including, but not limited to, a material like Sylgard 184 from Dow-Corning. The thickness of the interface pad 252 can be within a range between about 0.25 mm to about 8 mm.

As illustrated, the interface pad 205 can be disposed between the scintillator 213 and window 201. In particular, the interface pad 205 may be in direct contact with the protrusion 107, and more particularly in direct contact with the rear surface 109 of the protrusion 107. Notably, the interface pad 205 can be a pliable material, such that when fully assembled, the interface pad 205 is in a compressive state facilitated by the biasing member 217 and the interface pad 205 can deform around the surfaces of the protrusion 107. For example, during assembly the interface pad 205 can be deformed such that the external surfaces of the interface pad 205 are in direct contact with the rear surface 109 and side surface 111 of the protrusion 107. Use of a deformable material for the interface pad 205 can insure proper optical coupling between the scintillator 213, interface pad 205, and window 201.

Still, in other embodiments, given the desired contours of the interior of the detector housing 101, notably including the provision of the protrusion 107, a particularly designed interface pad can be employed. For example, an interface pad interface pad 205 can be used that has different portions, wherein the different portions have different sizes compared to each other. That is, for example, the interface pad 205 can have one portion configured to fit within the scintillator cavity 140 and another portion configured to be disposed within the opening 176 which has different dimensions (e.g., diameter or width) than that of the scintillator cavity 140. That is, in certain embodiments, the interface pad 205 can include an interface pad portion 206, having a particular dimension, such that it is particularly fitted to be disposed within the small opening 176 defined by the protrusion 107. Such designs can facilitate proper optical coupling and ensure that the surface of the interface pad is abutting a surface of the window 201.

Figure 3:
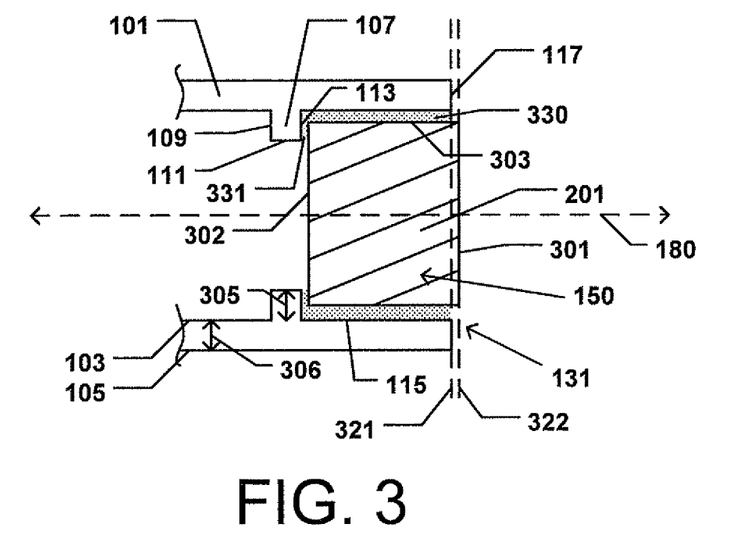
FIG. 3 includes a cross-sectional illustration of a portion of a scintillation article in accordance with an embodiment.

FIG. 3 includes a cross-sectional illustration of a portion of a scintillation article in accordance with an embodiment. In particular, FIG. 3 illustrates certain features of the window cavity 150 and window 201 in greater detail. In accordance with a certain design, the window 201 is configured to be bonded directly to an interior surface of the detector housing 101. Notably, such a configuration may be completed without the use of intermediate components for mechanically affixing the window 201 to the detector housing 101, such that the window 201 is self-fixturing to the detector housing 101. That is, the scintillation articles of the embodiments herein may not necessarily utilize window subassemblies built upon eyelets or other intermediate components that are first formed before such a window subassembly can be affixed to the detector housing.

As illustrated in FIG. 3, the window 201 can have a front surface 301 that extends substantially perpendicular to the longitudinal axis 180, a rear surface 302 extending parallel to the front surface 301 and substantially perpendicular to the longitudinal axis 180. Moreover, the window 201 can be formed to include a side surface 303 extending between the front surface 301 and rear surface 302 in a direction substantially parallel to the longitudinal axis 180 and substantially perpendicular to the front surface 301 and rear surface 302.

Figure 7A:
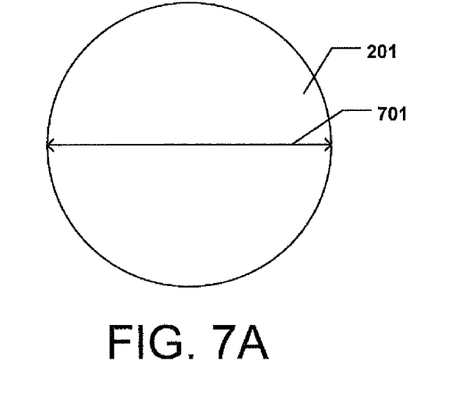
FIGS. 7A and 7B include illustrations of a window for use in a scintillation article in accordance with an embodiment.
Figure 7B:
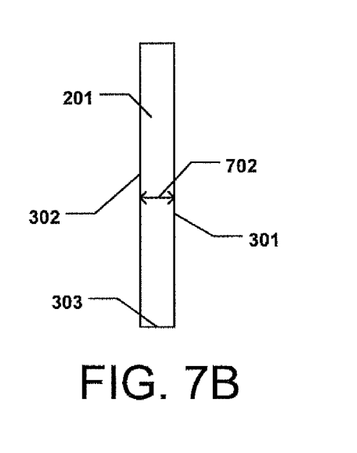

Referring briefly to FIGS. 7A and 7B, certain views of a window in accordance with an embodiment are provided. Generally, the embodiments herein utilize windows that can have a circular shape as viewed in a top down manner as illustrated in FIG. 7A. Accordingly, the window 201 can have a diameter 701. As described herein, the diameter 701 can be less than the diameter (or width) of the opening 175 at the distal end 131 of the detector housing 101 such that the window 201 can be loaded into the detector housing 101 at the distal end 131. Moreover, the window 201 can be formed such that the width of the window 701 at the front surface 301 has a width 701 that is substantially the same as a width of the window 201 at the rear surface 302. That is, in particular embodiments the window may not necessarily include tapered side surfaces 303 and as such the front surface 301 and rear surface 302 can have substantially the same width 701. As such, as illustrated in FIG. 7B, the cross-sectional shape of the window can be that of a rectangle wherein the front surface 301 and rear surface 302 are substantially parallel to each other and therein have substantially the same dimensions (width). The side surface 303 can extend between and separate the front surface 301 and rear surface 302.

Certain windows 201 can have different thicknesses depending upon the material selected. For example, a window 201 made of sapphire can have a thickness 702 measured between the front surface 301 and the rear surface 302 as illustrated in FIG. 7B that is within a range between about 1 mm and about 5 mm, such as between about 2 mm and about 5 mm. Other windows 201 can be made of a glass material (e.g., borosilicate containing material), which may have a greater thickness 702, such as between about 4 mm and about 8 mm, and more particularly between about 5 mm and about 7 mm.

Referring again to FIG. 3, the window 201 can be placed within the detector housing 101 such that a side surface 303 of the window 201 can be directly bonded to an interior surface, such as the inner, side surface 115 of the detector housing 101 within the window cavity 150. Notably, the side surface 303 of the window 201 can be bonded to the inner, side surface 115 such that it forms a bond joint 330 disposed along the interface of the side surface 303 and inner, side surface 115. In accordance with a particular embodiment, the bond joint can be characterized by a diffusion bond region. The diffusion bond region can be a region of interdiffusion between the material of the detector housing 101, material formulating the bond joint 330, and the window 201. More particularly, the diffusion bond region can be defined as a high temperature bond region wherein components of the detector housing 101 and material components of the bond joint material have diffused into each other at high temperatures thereby forming a diffusion bond region at the interface between the detector housing and bond joint 330.

The window cavity 150 of the detector housing 101 can be sized and shaped such that a bond gap exists at the interface between the inner, side surface 115 of the detector housing 101 and the side surface 303 of the window 201. The bond gap can be particularly small, such that a suitable bond joint 330 can be formed and the assembly of the window 201 and detector housing 101 has sufficient mechanical integrity. For example, embodiments herein may utilize a bond gap having a dimension as measured perpendicular to the axis 180 at the interface of the side surface 303 of the window 201 and the inner, side surface 115 of the detector housing 101 of not greater than about 0.25 mm. In other instances, the bond gap can be less, such as not greater than about 0.2 mm, not greater than about 0.1 mm, not greater than about 0.08 mm, not greater than about 0.07 mm, not greater than about 0.06 mm, or even not greater than about 0.05 mm. Particular embodiments may utilize a bond gap having a dimension within a range between about 0.01 mm and about 0.1 mm, between about 0.01 mm and about 0.09 mm, between about 0.01 and about 0.08 mm, and even between about 0.02 mm and about 0.05 mm. It will be appreciated that the size of the bond gap (i.e., space between the side surface 303 and the inner, side surface 115) noted herein can be substantially the same width of the bond joint 330 in the final formed article.

In certain embodiments, the bond joints may include a braze material. Some suitable braze materials can include inorganic materials. In particular instances, the bond joint 330 includes a braze material that can include a metal material, ceramic material, or a combination thereof. In particular instances, the bond joint 330 can include an oxide material. Additionally, the braze material can include a metal or metal alloy. Some suitable metal species present within the braze material can include transition metal elements. Certain braze materials can include metals such as titanium, silver, copper, nickel, gold, zinc, and a combination thereof. Moreover, the braze material can incorporate some amount of other species, such as silicon, phosphorous, and the like.

The formation of the bond joint 330 can be accomplished through brazing techniques that include application of the braze material, such as in the form of a strip of material, a tape, or a paint, to the side surface 303 of the window 201 and placing the window 201 within the window cavity 150. The assembly can then be heated to melt the braze material and form the bond joint 330. Heating can be accomplished through induction brazing, furnace brazing, and the like.

As further illustrated in FIG. 3, the window 201 can be placed within the window cavity 150 and secured to the detector housing 101 wherein a portion of the rear surface 302 of the window 201 is directly bonded to a surface of the protrusion 107. In particular, a portion of the rear surface 302 of the window 201 can be directly bonded to the front surface 113 of the protrusion 107 via a bond joint 331. The bond joint 331 can include those characteristics as described in accordance with the bond joint 330.

As further illustrated, the window 201 may be secured within the window cavity 150 of the detector housing 101 such that a portion of the window 201 protrudes axially from the detector housing 101. In particular, the front surface 301 of the window 201 can be disposed at an axial position along the longitudinal axis 180 that is different than the axial position of the front, external surface 117 of the detector housing 101 such that the window protrudes from the detector housing 101. Such a design can facilitate proper optical coupling with a sensor, such as a photodetector. Notably, the embodiments herein can utilize a design wherein the front, external surface 117 of the detector housing 101 defines a plane 321 and the front surface 301 of the window 201 can define a second plane 322. In certain instances, the plane 321 and plane 322 may be displaced axially along the longitudinal axis 180 from each other generally by a distance, and thus the front surface 301 of the window 201 is axially displaced a distance from the front, external surface 117 of the detector housing 101. The distance of axial displacement between the planes 321 and 322 can be not greater than about 1 mm, not greater than about 0.5 mm, and more particular not greater than about 0.25 mm.

In other designs, the plane 321 and the plane 322 can be overlapping, and in such cases, the front surface 301 of the window 201 is flush with the front, external surface 117 of the detector housing 101. That is, the window 201 can be flush with the external surface 117 and the window 201 is not protruding axially beyond the external surface 117 of the detector housing 101.

In further reference to particular features of the detector housing 101, the detector housing 101 can have a side wall thickness 306 as measured between the inner surface 103 and outer surface 105 of the detector housing 101 at a direction substantially perpendicular to the longitudinal axis 180 of the detector housing 101. Moreover, the protrusion 107 can be formed such that it has a height 305 as measured along a distance substantially perpendicular to the longitudinal axis 180 between the side surface 111 and the inner surface 103. According to certain designs, the detector housing 101 can be formed such that the height 305 of the protrusion 107 is not greater than the thickness 306 of the detector housing 101.

In other certain instances, the protrusion 107 can be formed such that the height 305 is significantly less than the thickness 306 of the detector housing 101. That is, the height 305 can be not greater than about 90% of the thickness 306 based on the calculation $(H_p/T_{dh}) \times 100\%$, wherein $T_{dh}$ is the thickness 306 of the detector housing 101 and $H_p$ is the height 305 of the protrusion 107. In more particular instances, the protrusion 107 can have a height 305 that is not greater than about 75%, not greater than about 50%, not greater than about 25%, or even not greater than about 15% of the entire thickness 306 of the detector housing 101. Particular designs may utilize a protrusion 107 having a height 305 that is within a range between about 1% and about 50%, such as between about 1% and about 25%, between about 1% and about 10%, or even between about 1% and about 5% of the thickness 306 of the detector housing 101.

The protrusion 107 can have a height 305 that may be dependent upon the thickness 306 of the detector housing 101, such that a particular ratio between the height 305 of the protrusion 107 and the thickness 306 of the housing is utilized. In particular instances, the protrusion 107 can have a height 305 that is not greater than about 1 mm, such as not greater than about 0.75 mm, not greater than about 0.5 mm, not greater than about 0.3 mm, not greater than about 0.25 mm. In certain designs, the protrusion 107 can have a height 305 within a range between about 0.05 mm and about 0.75 mm, between about 0.05 mm and about 0.5 mm, between about 0.05 mm and about 0.3 mm, and even between about 0.1 mm and about 0.25 mm.

Additionally, the protrusion 107 can have a particular thickness measured in a direction perpendicular to the height 305 along the dimension of the surface 111, otherwise in the direction along the axis 180. Notably, for certain designs, the protrusion 107 can have a thickness that is at least the same as the dimension of the height 305. In fact, the protrusion 107 can be formed to have certain dimensions in terms of height 305 and thickness that facilitate proper seating of the window 201, suitable mechanical rigidity and support, while also providing limited optical interference.

For example, in certain instances, the thickness of the protrusion 107 can be at least about 0.25 mm, such as at least about 0.5 mm, at least about 0.75 mm or even at least about 1.0 mm. Particular designs can have a protrusion 107 having a thickness within a range between about 0.25 mm and about 3 mm, such as between about 0.5 mm and about 2 mm, between about 0.5 mm and about 1.8 mm, or even between about 0.75 mm and about 1.5 mm.

Figure 4:
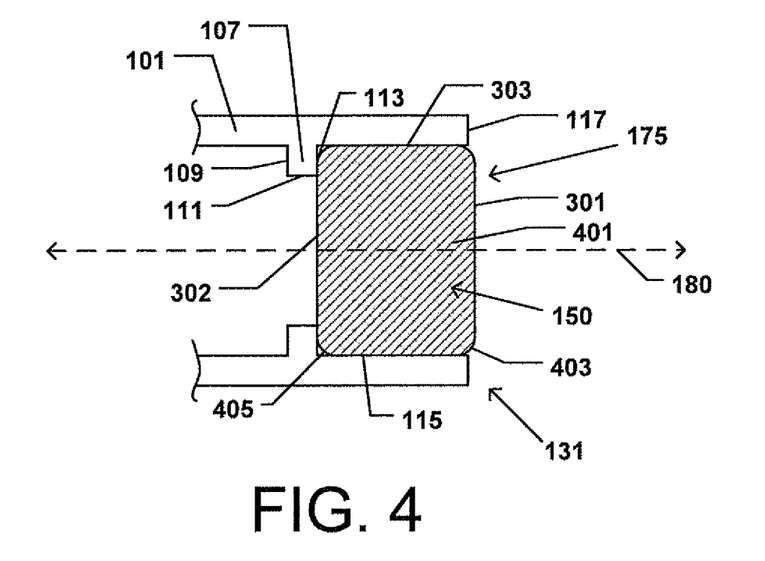
FIG. 4 includes a cross-sectional illustration of a portion of a scintillation article in accordance with an embodiment.

FIG. 4 includes a cross-sectional illustration of a portion of a scintillation article in accordance with an embodiment. Notably, the illustration of the portion of the scintillation article of FIG. 4 includes a window 401 having a radiused edge 403 between and joining the front surface 301 and the side surface 303 of the window 401. Additionally, the window 401 can have a radiused edge 405 between and joining the rear surface 302 and the side surface 303 of the window 401. The formation of radiused edges may facilitate loading of the window 401 into the window cavity 150 through the opening 175 at the distal end 131 of the detector housing 101. Moreover, the provision of radiused edges 403 and 405 on the window 401 may reduce the likelihood of damage to the window along these edges during operation of the scintillation article under high temperatures and stresses.

Figure 5:
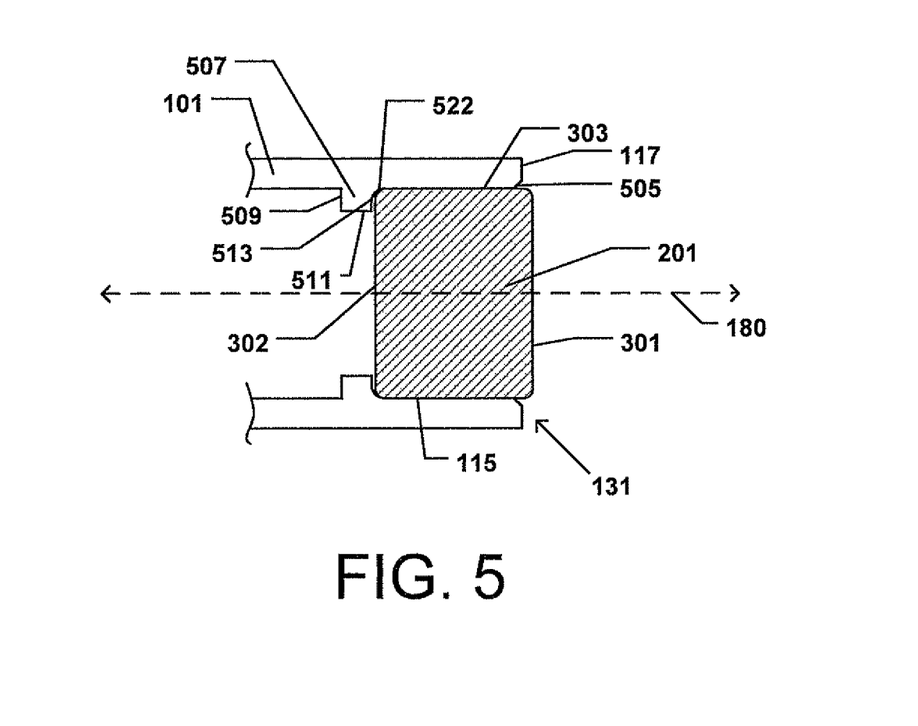
FIG. 5 includes a cross-sectional illustration of a portion of a scintillation article in accordance with an embodiment.

FIG. 5 includes a cross-sectional illustration of a portion of a scintillation article in accordance with an embodiment. As illustrated, the detector housing 101 can be formed to include a chamfered edge 505 extending between an inner side surface 115 of the detector housing 101 and a front, external surface 117 of the detector housing. The chamfered surface 505 can extend between the inner, side surface 115 and front, external surface 117 at an angle to the longitudinal axis 180 of the detector housing 101. Provision of the chamfered surface 505 may facilitate loading of the window 201 into the window cavity 150 at the distal end 131 of the detector housing 101.

The detector housing 101 can be formed to have particularly shaped edges. For example, within the interior of the detector housing 101, particularly at surfaces configured to engage the window 201 within the window cavity 150, certain edges can be shaped, such as chamfered or radiused to reduce stress and improve contact with surface of the window 201. In particular instances, the edge 522 between the inner, side surface 115 of the window cavity 150 and the front surface 513 of the protrusion 507 can have a curvilinear shape such that the edge 522 is radiused. The provision of the radiused edge 522 can reduce stress concentrations derived from temperature changes and mechanical stresses encountered during operation of the scintillation article. Additionally, the radiused edge 522 can improve contact with a complementary radiused edge (see, for example edge 405 of FIG. 4) of the window 201, which can improve the bonding between the detector housing 101 and window 201.

Figure 6:
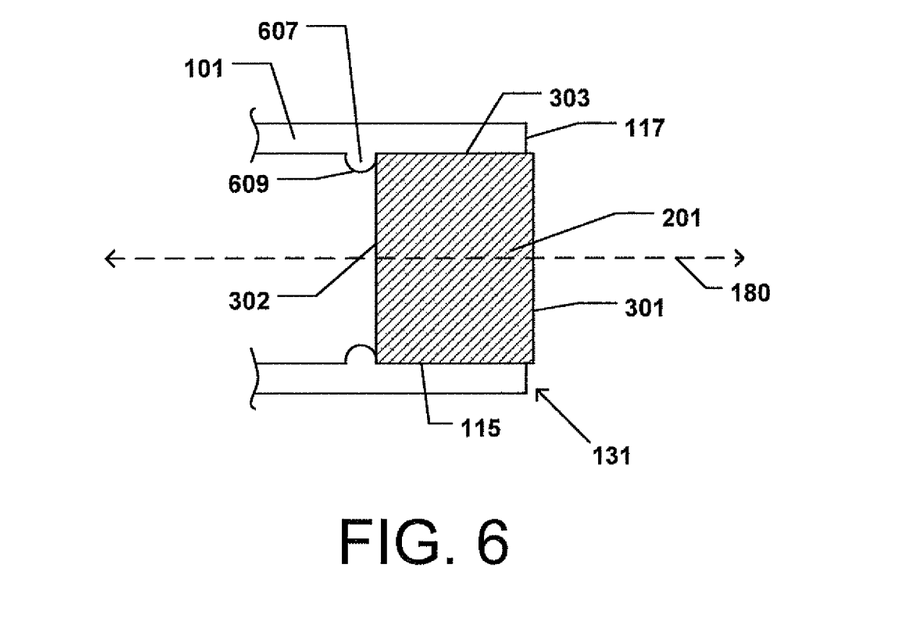
FIG. 6 includes a cross-sectional illustration of a portion of a scintillation article in accordance with an embodiment.

FIG. 6 includes a cross-sectional illustration of a portion of a scintillation article in accordance with an embodiment. In particular, FIG. 6 illustrates particular features of the window cavity and portions of the detector housing 101 in accordance with an embodiment. Notably, the detector housing 101 is formed with a protrusion 607 extending radially inward from an inner surface 103 of the detector housing 101. While the foregoing protrusions 107 have been illustrated as having substantially linear surfaces, other protrusions may be formed to have various surface contours. For example, the protrusion 607 of FIG. 6 utilizes a curvilinear surface 609 extending from the inner surface 103 of the detector housing 101. Utilization of a curvilinear surface 609 may be reduce the stress concentrations on the housing and thus reduce stresses on the bond joint at the surfaces of the protrusion 607 and thus stresses on the window 201 during operation of the scintillation article. Moreover, utilization of a protrusion 607 having a curvilinear surface 609 may facilitate the deformation of the interface pad 205 around the protrusion.

Figure 8:
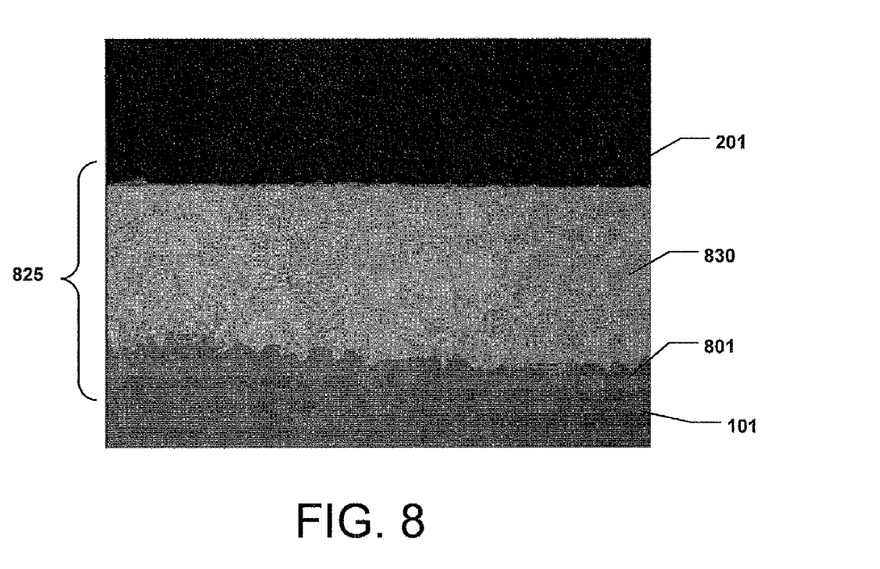
FIG. 8 includes a cross-sectional illustration of a portion of a bond joint within the scintillation article in accordance with an embodiment.

FIG. 8 includes a magnified image of a portion of a scintillation article in accordance with an embodiment. In particular, FIG. 8 illustrates a bond joint 825 including a window 201, a bond material 830 (e.g., ABA Cusil® from Wesgo Metals), and the detector housing 101 taken at 200× magnification. Notably, the bond joint 825 can include a diffusion bond region 801 at the interface between the bond material 830 and detector housing 101. The diffusion bond region 801, as described herein, includes a region at the interface between the detector housing 101 and bond material 830 characterized by interdiffusion of chemical components between the detector housing 101 and bond material 830 by virtue of high temperature processing. As illustrated, the diffusion bond region 801 is represented by an erratic, non-linear boundary between the bond material 830 and detector housing 101 demonstrating interdiffusion of the components at the interface between the bond material 830 and detector housing 101.

Figure 11:
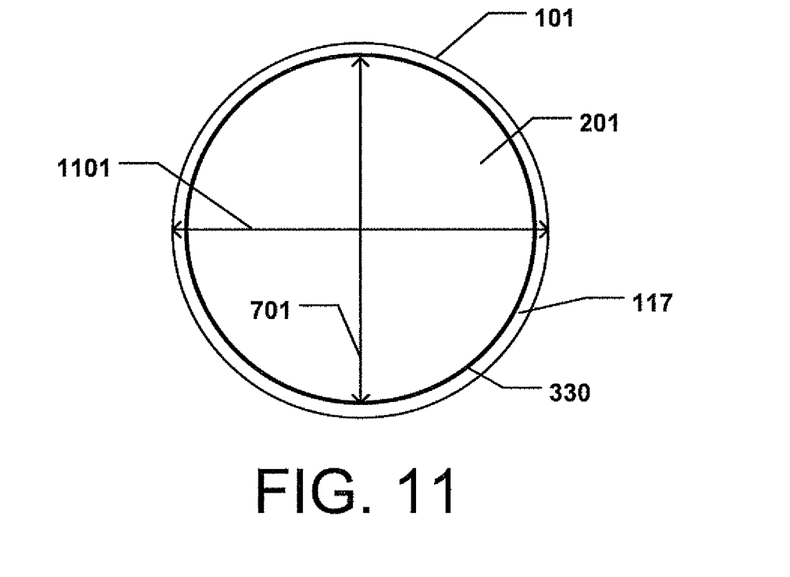
FIG. 11 includes an end view of a scintillation article including a window contained within a window cavity of a detector housing in accordance with an embodiment.

Referring briefly to FIG. 11 an end view of a scintillation article is provided. In particular, FIG. 11 includes an end view looking along the longitudinal axis 180 of the detector housing 101 at the window cavity 150. A window 201 is disposed at the end of the detector housing 101 in an assembled scintillation article as described in accordance with embodiments herein. The window 201 is directly bonded to the inner side surface of the detector housing 101 and a bond joint 330 is disposed at the interface between the window 201 and the detector housing 101 extending circumferentially around the perimeter of the window 201.

In accordance with one embodiment, the detector housing 101 has a total external, lateral surface area (TEA) extending in the plane of the external, front surface 117 and having a circular area (TEA=$\pi(OD/2)^2$) defined by an outer diameter (OD) 1101 of the detector housing 101. That is, the lateral surface area includes a measure of the diameter (or width) across the front end of the detector housing in a plane defined by the surface of the external, front surface 117. The detector housing 101 can have an outer diameter 1101 of at least about 10 mm, at least about 15 mm, at least about 20 mm, at least about 25 mm, or even at least about 30 mm. In particular instances, the outer diameter 1101 of the detector housing 101 can be within a range between about 10 mm and about 100 mm, such as between about 10 mm and about 80 mm, such as between about 10 mm and about 60 mm.

Notably, the assembly of the window 201 and the detector housing 101 is designed to increase the percentage of the total external, lateral surface area that incorporates the window 201, to improve the performance of the scintillation article. In certain designs, the window 201 has a window area (WA), which can be a circular area (WA=$\pi(WD/2)^2$) defined by the window diameter 701 (WD), and can be a certain percentage of the total external, lateral surface area as defined by the equation WA=[WA/TEA]. According to certain embodiments, the window area includes at least about 88% of the total external, lateral area of the front of the detector housing 101. In certain other designs, the window area includes at least about 91%, at least about 92%, at least about 93%, and even on the order of at least about 94% of the total external lateral area of the front surface of the detector housing. Particular embodiments can utilize a window area within a range between about 88% and about 99%, between about 90% and about 99%, between about 90% and about 98%, or even between about 91% and about 97% of the total external, lateral area of the front surface of the detector housing 101. It will be appreciated, that the calculation of the window area does not include the area used by the bond joint 330.

The scintillation articles herein exhibit improved photo collection efficiency that facilitates accuracy of readings during use. In accordance with embodiments herein the scintillation articles demonstrate a photo collection efficiency of at least about 74%. In other embodiments, the photo collection efficiency can be greater, such as at least 75%, or even at least about 76%. Particular articles herein may demonstrate a photon collection efficiency within a range between about 74% and about 90%, such as between about 74% and about 85%, or even between about 75% and about 80%.

Additionally, designs herein exhibit improved coupling between the window and detector housing such that the failure stress that the bond assembly including the window, detector housing, and bond joint can withstand is improved. That is, the window can be directly bonded to an inner surface of the detector housing via the bond joint to form a bond assembly and the bond assemblies of embodiments herein demonstrate a failure stress of at least 130 MPa.

In certain instances, the bond assembly can utilize a window comprising an amorphous material (e.g., glass window) and the bond joint may employ a frit material, such as those disclosed in U.S. Pat. No. 7,550,729 incorporated herein, and particularly a frit material including an oxide material like silica. In such instances, the bond assembly demonstrates a failure stress of at least 135 MPa. In other instances, this failure stress may be greater, such as at least about 140 MPa, such as at least about 150 MPa, or even at least about 160 MPa. In particular instances, such bond assemblies demonstrate a failure stress within a range between about 130 MPa and about 250 MPa, such as between about 130 MPa and 200 MPa.

According to other designs, the bond assembly may incorporate a window made of a single crystal (e.g. sapphire) and a bond joint employing a braze material (e.g. a titanium-based material). In such designs, the bond assembly of the window, bond joint, and detector housing, may exhibit a failure stress of at least about 150 MPa. In other instances, the failure stress may be at least about 160 MPa, such as at least about 170 MPa, or even at least about 200 MPa. Particular designs of the bond assembly utilizing the single crystal material and braze material can have a minimum failure of stress within a range between about 150 MPa and about 300 MPa, such as between about 150 MPa and about 250 MPa, or even between about 150 MPa and about 225 MPa.

With regard to the assembly of the device, initially the surfaces of the window and the detector housing can be cleaned to remove oxides and residue that may interfere with the formation of a suitable bond joint. Conventional cleaning techniques can be used to prepare the surfaces and avoid and/or remove contaminants. For example, cleaning can be performed by utilizing a detergent and/or a solvent. Examples of such suitable cleaning agents include, but are not limited to, organic and aqueous solutions such as isopropyl alcohol. Typically, lint-free materials are also utilized during the surface preparation process to prevent or reduce the likelihood of the presence undesirable substances on the wetted surfaces. Other surface preparation techniques such as, but not limited to, acid etching and/or ultrasonic dipping can also be utilized. Where suitable, cleaning equipment such as washing machines, ultrasonic cleaners, pickling equipment, and other various cleaning systems, can be utilized in the techniques of the invention. Subsequent to cleaning, the cleaned components may be dried before assembly.

After the surfaces of the window and the detector housing have been sufficiently cleaned, the bond material may be applied to the side surface of the window or the inner, side surface of the detector housing any suitable technique including, for example, brushing, spraying, screening, coating and the like. In accordance with one or more particular embodiments, application of the bond material may be performed by utilizing a paint brush (e.g., a horse hair paint brush), wherein the bond material is in the form of a slurry to reduce the formation of bubbles during application. After application of the bond material, some drying, heating, curing or a combination thereof may be suitable, particularly in instances where the bond material is applied as a slurry, to remove any solvents. Use of a slurry may be most suitable with bond materials containing a frit material.

In some embodiments, rather than applying the bond material as a liquid or slurry, the bond material may be applied as a solid material, which can be in the form of a wire, tape, or other malleable form. In still other embodiments, the bond material may have a pre-formed shape suitable for seating and proper placement with regard to the window and inner, side surface of the detector housing. Notably, no intermediate components, such as an eyelet is necessary for direct bonding between the window and the detector housing.

In accordance with further embodiments herein, the window can be secured directly to the detector housing by utilizing brazing techniques. The brazing material, typically a brazing alloy, can be selected to provide certain characteristics or performance as noted herein and can further facilitate hermetically sealing at least one chamber within the detector apparatus. Brazing provides advantages over conventional techniques because it facilitates the operation of systems and/or assemblies at higher temperatures. Notably, the utilization of brazing techniques can reduce the magnitude of any discontinuity between differing materials with respect to their coefficients of thermal expansion. Indeed, even if conventional fabrication procedures provide less expensive assemblies, the utilization of brazing techniques improves reliability of assembled systems because any stresses associated with thermal cycling can be mitigated by brazing.

Non-limiting examples of brazing materials include those commercially available from WESGO® Metals, Hayward, Calif. For example, the window comprising sapphire can be brazed to a housing assembly comprising titanium by utilizing TICUSIL® brazing alloy, TICUNI® alloy, CUSIL ABA® alloy, CUSIL® alloy, INCUSIL-10® alloy, INCUSIL ABA® alloy, CUSIL® alloy CUSIL® alloy Brazing can be performed by utilizing any suitable brazing technique. For example, brazing can involve activating by heating the brazing alloy to facilitate wetting the surfaces to be joined with the brazing alloy. In some cases, brazing can be performed under an inert atmosphere and/or under an atmosphere that prevents oxidation of the substrates or the brazing alloy. For example, brazing can be performed under a vacuum or under a purging nitrogen blanket. Where appropriate, releasing or masking agents may be utilized to prevent or protect against brazing alloy exposure. Non-limiting examples of masking agents include lacquers such as those commercially available as NICOBRAZ® STOP-OFF™ from Wall Colmonoy Corporation, Madison Heights, Mich. Likewise, other brazing aids may be utilized including, for example, fluxes, cements, and/or fillers.

Examples of suitable heating techniques include, for example, those that utilize induction heating principles. Heating can be performed under a vacuum atmosphere or under an inert gas purging atmosphere. Examples of induction heating systems include those commercially available from, for example, Induction Atmospheres, LLC, Rochester, N.Y. Heating can also be performed in a furnace or oven having vacuum or inert gas purging capabilities that can prevent or inhibit oxidation while processing.

Any suitable vacuum level may be utilized but, in accordance with some aspects of the invention, vacuum atmospheres during brazing typically are about the $10^{-5}$ atmospheres. Where inert gas is used, purging may similarly be performed to maintain or inhibit oxidation of the components. For example, purging may be performed with argon or nitrogen or any other inert gas with a volume equal to about ten times the volume of the vessel at a rate of 30 cubic feet per minute. At the appropriate brazing temperature, a heat soak may optionally be maintained to insure or promote thorough wetting of surfaces to be joined. For example, heating may be performed for a period about 15 minutes including a dwell temperature or soaking temperature that can last from about 10 minutes to about 15 minutes. Typically, the heat soak temperature is any suitable temperature that promotes melting and/or activation of the active brazed component of the brazing material. For example, heating can be performed to achieve a heat soaking temperature of about 900° C.

Thereafter, the assembly of the window directly bonded to the detector housing can be allowed to cool to room temperature. Cooling can be optionally performed at a controlled rate. The cooled assembly may then be cleaned off with water to remove any masking agents. Visual inspection as well as other tests directed at ensuring the quality of the assembled system may also be performed.

EXAMPLE 1

Figure 10:
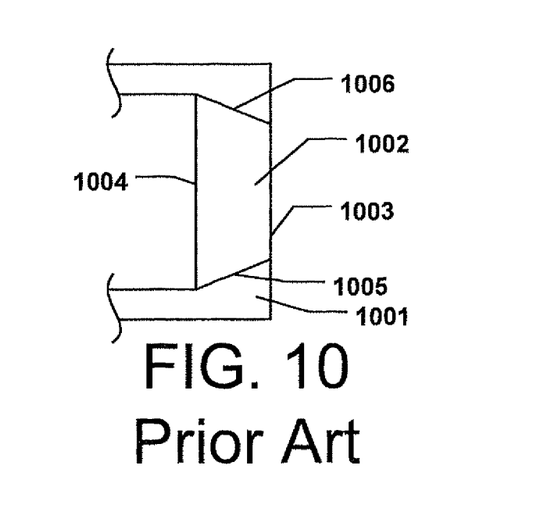
FIG. 10 includes a cross-sectional illustration of a portion of a prior art detector including a rear-loaded window design.

Conventional detector assemblies comprising a detector housing a back-loaded window, wherein the window utilizes a tapered edge configured to be engaged with a complimentary tapered edge at a distal end of the housing (See, for example, the prior art detector housing assembly of FIG. 10) were compared to scintillation articles including the detector assemblies of embodiments herein in a modeling experiment. Two types of conventional detector assemblies were compared with detector assemblies of the embodiments herein. Notably, the first conventional detector assembly (Conventional Sample 1) utilized a window made of optical glass obtained from Saint-Gobain Corporation and commercially available as Diamant and a second conventional detector assembly utilizing a window made of sapphire (Conventional Sample 2) available as optical grade high-purity sapphire from Rubicon Technology, Inc. Likewise, for comparative purposes, two detector assemblies according to embodiments herein were modeled, a first sample (Sample 3) using a window of the same optical glass quality as Conventional Sample 1, and a second detector assembly (Sample 4) using a window made of the same sapphire as Conventional Sample 2. Accordingly, the differences between the conventional samples and the samples formed according to embodiments were the shape of the windows (i.e., the conventional samples having a tapered shape) and certain dimensions of the windows (e.g., thickness) since the samples formed according to embodiments herein may employ a different window thickness for proper seating and direct bonding to the detector housing. All other variables were the same between all the samples. The properties of each of the samples were simulation modeled according to the following specifications to determine the photo collection efficiency of the detectors, and in particular, the effect of the design of the window and detector housing on the photo collection efficiency.

A Monte Carlo optical transport code, DETECT2000, was used to simulate detection events and measure the photo collection efficiency of the four samples noted above. Inputs to DETECT2000 were based on the materials of the components used and particular operating conditions for the scintillator including emission spectrum of the scintillator, the refractive index of all the materials, diffuse and specular reflectivity components of the reflector, self absorption in the scintillator, scattering length within the scintillator, and surface roughness of the materials.

Modeling was completed based upon the following dimensions of the crystal and window. Conventional Sample 1, utilizing the optical glass window material was simulated to employ a window diameter of 1.6 inches (approximately 41 mm), a window thickness of 0.157 inches (approximately 4.0 mm), a scintillator made of NaI(Tl) crystal material having a diameter of 1.59 inches (approximately 40 mm), and a length of 3.07 inches (approximately 78 mm). Sample 3 utilizing the optical glass window material was simulated to employ a window diameter of 1.6 inches (approximately 41 mm), a window thickness of 0.25 inches (approximately 6.4 mm), a scintillator made of NaI(Tl) crystal material having a diameter of 1.59 inches (approximately 40 mm), and a length of 3.07 inches (approximately 78 mm).

Conventional Sample 2 utilizing the sapphire window material was simulated to employ a window diameter of 1.12 inches (approximately 28 mm), a window thickness of 0.075 inches (approximately 1.9 mm), a scintillator made of NaI (Tl) crystal material having a diameter of 1.03 inches (approximately 26 mm), a length of 4.19 inches (approximately 106 mm). Sample 4 utilizing the sapphire window was simulated to employ a window diameter of 1.17 inches (approximately 30 mm), a window thickness of 0.08 inches (approximately 2.0 mm), a scintillator made of NaI(Tl) crystal material having a diameter of 1.03 inches (approximately 26 mm), a length of 4.19 inches (approximately 106 mm).

In particular, for each simulation of the four samples, 4000 pulses of photons were transported through the detector having starting conditions for each pulse of optical photons based upon a random point in the volume of the NaI(Tl) scintillator crystal material. From each point, 6300 photons were launched, which corresponds to the number of photons produced by a 662 keV gamma ray in NaI(Tl) multiplied by 0.25, which represents a typical quantum efficiency of a photomultiplier tube.

Every optical photon was simulated to be born with a random direction, and further, upon reaching a surface, the photon was given four options, including passing through the surface, undergoing a Fresnel reflection at the surface, reflecting at the surface by the white reflector, or absorbing at the surface by the reflector. Conditions were further set such that as the photon travels through the scintillator, there is a non-zero chance of being absorbed or scattered by the bulk scintillator and the ultimate fate of every optical photon is to be either absorbed somewhere or collected. Here, collected means to reach the photocathode surface of the PMT.

Figure 9:
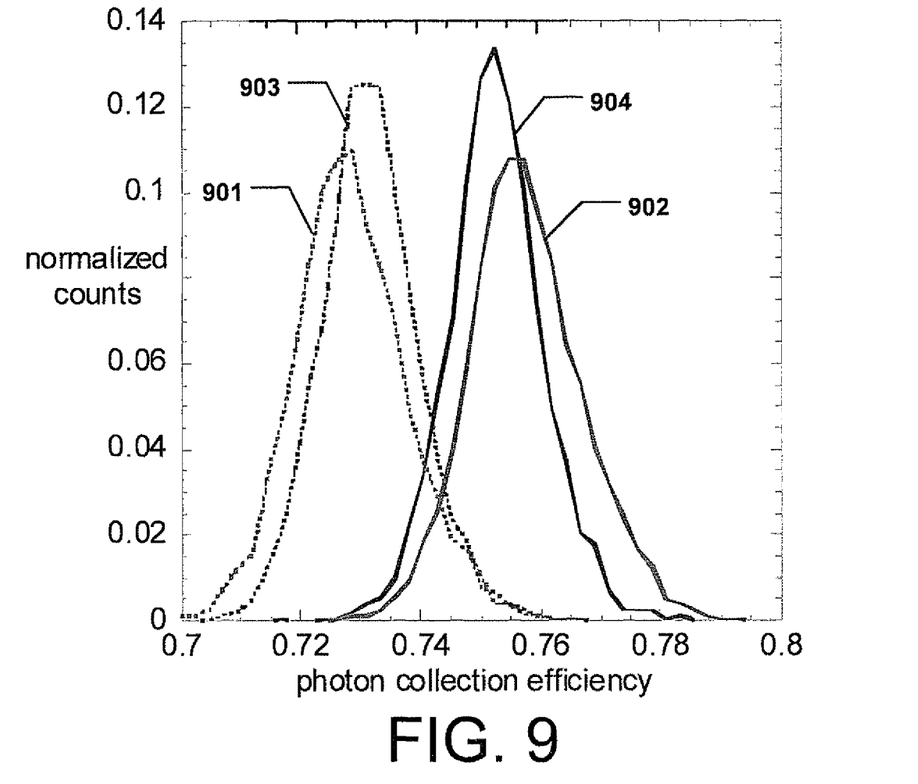
FIG. 9 includes a plot of normalized counters of photon collection efficiency for certain scintillation articles in accordance with an embodiment as compared to conventional scintillation articles.

FIG. 9 includes a plot of photo collection efficiency as compared to normalized counts for the samples of Example 1. Notably, Conventional Sample 1, represented by plot 901 utilizing the optical glass quality window demonstrated a mean photo collection efficiency of approximately 73%. By comparison, the detector housing assembly of Sample 3, represented by plot 902, demonstrated a photo collection efficiency having a mean of approximately 76%. As illustrated clearly in FIG. 9, the detector housing assembly of the embodiments herein showed an improvement of approximately 3% between the mean of plot 902 as compared to the mean of plot 901.

Likewise, the photo collection efficiency of Conventional Sample 2 is represented by plot 903, which can be compared to the photo collection efficiency of Sample 4, represented by plot 904. As illustrated, the photo collection efficiency of Conventional Sample 2 had a mean photon collection efficiency of approximately 73%, while Sample 4 demonstrates a mean photon collection efficiency of approximately 75%. As such, Sample 4 has approximately 2% greater mean photo collection efficiency as compared to the comparative sample.

Without wishing to be tied to a particular theory, it is suspected that the utilization of tapered edges on the surfaces of the window combined with coupling procedures utilized in the back-loaded detector housing designs causes a reduction of photo collection efficiency due to losses at the interface of the tapered edge of the window and complimentary tapered edge of the detector housing. Those in the art recognize the importance of photo collection efficiency, and even an increase of 2% in the photo collection efficiency is quite significant, noting that the number of scintillation events generated by a scintillator during operation can be in the hundreds of thousands or even greater, and 2% of such an enormous number is quite significant.

According to embodiments herein a scintillation article is disclosed that represents a departure from the state-of-the-art. The scintillation articles of embodiments herein have particular detector housing designs, having window cavities and scintillator cavities in particular portions within the interior, which can be separated by a protrusion for a front-loaded window design. Additional features such as particular window geometries, shapes of surfaces, and shapes of the protrusion have demonstrated improvement in the assembly of the article and operational parameters of the article, such as the photon collection efficiency. Moreover, the use of particular bond materials and the formation of particular bond joints that can be characterized, at least in part, by a diffusion bond region have been demonstrated as suitable for use in various environments.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments.

What is claimed is:

1. A scintillation article comprising:
    a detector housing comprising a window cavity, a scintillator cavity, and a protrusion disposed between the window and scintillator cavities;
    a scintillator disposed within the scintillator cavity, wherein substantially none of the scintillator extends into an annulus defined by the protrusion; and
    a window disposed within the window cavity, the window cavity defining a window opening at an external surface of the housing that has a greater width than a width of the window, and wherein a surface of the window is directly bonded to an interior surface of the detector housing at a bond joint comprising a diffusion bond region.

2. The scintillation article of claim 1, wherein the bond joint comprises a braze material.

3. The scintillation article of claim 2, wherein the diffusion bond region comprises a region at the interface between the detector housing and braze material of interdiffusion between the materials of the braze material and the housing at the bond joint.

4. The scintillation article of claim 1, wherein the protrusion has a height is not greater than about 90% of a thickness of the detector housing.

5. The scintillation article of claim 4, wherein the protrusion is a rim extending through a circumference of the inner surface of the detector housing.

6. The scintillation article of claim 4, wherein the window cavity is a region defined between the protrusion and a distal end of the housing.

7. The scintillation article of claim 1, wherein the scintillator is spaced apart from the protrusion.

8. A scintillation article comprising:
a detector housing comprising a window cavity, a scintillator cavity, and a protrusion disposed between the window and scintillator cavities;
a scintillator disposed within the scintillator cavity, wherein substantially none of the scintillator extends into an annulus defined by the protrusion; and
a window comprising a crystalline material disposed within the window cavity, the window having a front surface, a rear surface generally parallel to the front surface, and a side surface extending between the front surface and rear surface, wherein a portion of the rear surface is directly contacting an inner surface of the housing.

9. The scintillation article of claim 8, wherein a side surface of the window is directly bonded to an inner surface of the housing at a bond joint comprising a diffusion bond region.

10. The scintillation article of claim 8, wherein the side surface extends at a substantially perpendicular angle to the front surface of the window.

11. The scintillation article of claim 10, wherein the side surface extends at a substantially perpendicular angle to the rear surface of the window.

12. The scintillation article of claim 8, wherein the scintillator is spaced apart from the protrusion.

13. The scintillation article of claim 8, wherein the window cavity is disposed at a distal end of the detector housing at an external, front surface of the detector housing.

14. The scintillation article of claim 13, wherein the window cavity is defined as a region between the protrusion that extends radially inward from an inner surface of the detector housing, and a front surface of the detector housing.

15. The scintillation article of claim 14, wherein the window protrudes axially from the detector housing beyond the front surface of the detector housing.

16. A scintillation article comprising:
a detector housing comprising a window cavity, a scintillator cavity; and a protrusion disposed between the window and scintillator cavities;
a scintillator disposed within the scintillator cavity, wherein substantially none of the scintillator extends into an annulus defined by the protrusion; and
a window disposed within the housing, the window having a front surface, a rear surface generally parallel to the front surface, and a side surface extending between the front surface and rear surface at a substantially perpendicular angle to the front surface, wherein the detector has a photo collection efficiency of at least about 74%.

17. The scintillation article of claim 16, wherein the photo collection efficiency is at least about 75%.

18. The scintillation article of claim 17, wherein the photo collection efficiency is within a range between about 74% and about 90%.

19. The scintillation article of claim 16, wherein the side surface of the window extends at a substantially perpendicular angle to the rear surface of the window.

20. The scintillation article of claim 16, wherein the scintillator is spaced apart from the protrusion.

* * * * *